UNITED STATES PATENT OFFICE 2,591,540

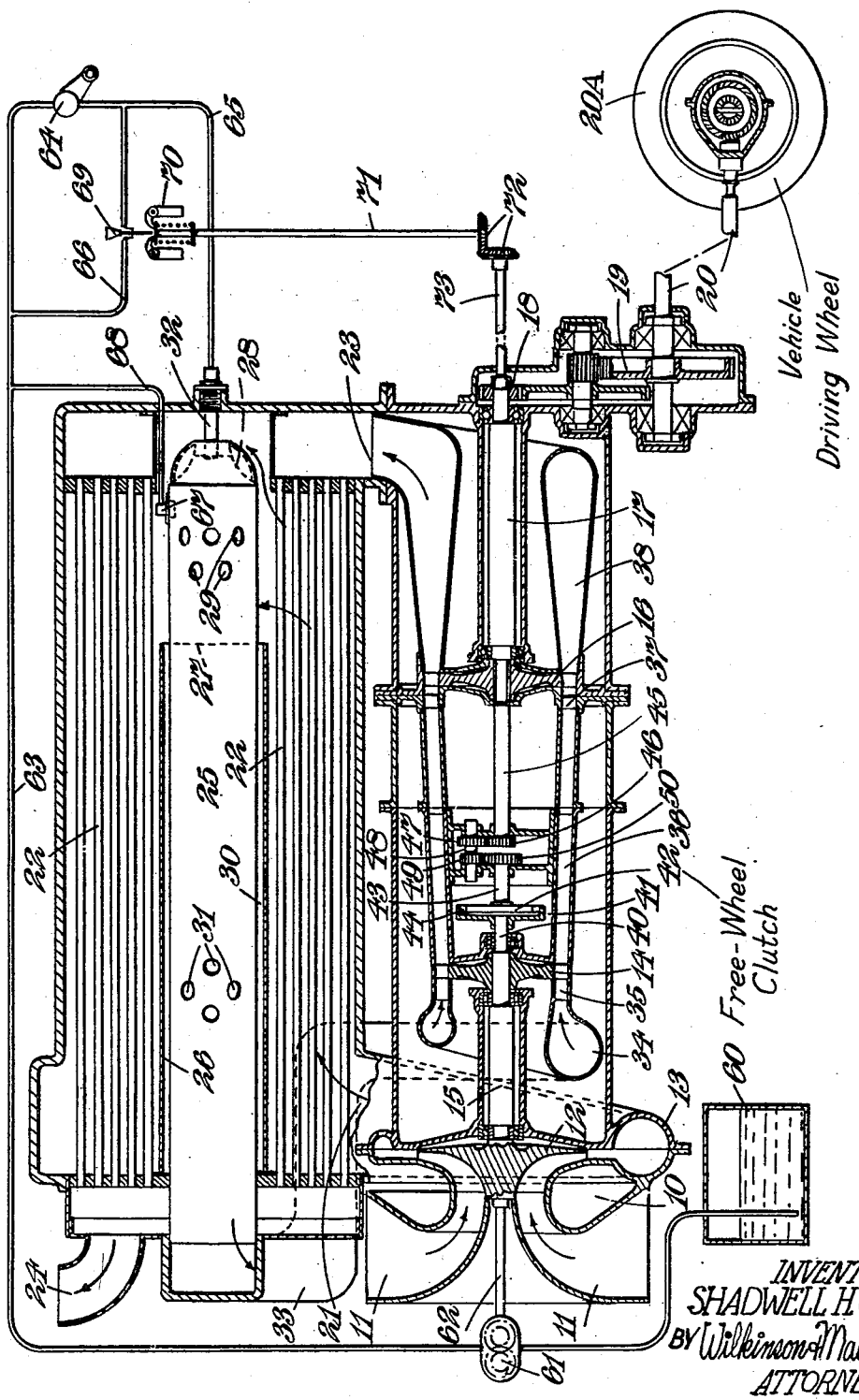

VEHICLE GAS TURBINE FREE WHEEL OVERDRIVE

Shadwell Harry Grylls, Duffield, England, assignor to Rolls-Royce Limited, Derby, England, a British company Application December 1, 1947, Serial No. 789,099
In Great Britain November 29, 1946

Section 1, Public Law 690, August 8, 1946
Patent expires November 29, 1966

22 Claims. (Cl. 60—39.16)

This invention relates to vehicle-propulsion, and more particularly to automobile or like vehicle propulsion systems in which power from a prime mover or engine is transmitted to driving wheels or equivalent propelling means. The invention is concerned with the provision of a gas-turbine-power-installation and suitable transmission therefor, the object of the invention being to provide desirable characteristics in a gas-turbine vehicle power-installation.

It is contemplated that in the application of a gas-turbine to a wheeled vehicle, e. g., an automobile, that the engine will comprise a compressor driven by a turbine hereinafter referred to as the compressor-turbine and a separate power-turbine drivingly connected with the driving wheels, or equivalent propelling means.

According to the present invention in one aspect a gas-turbine power plant for vehicle propulsion of the above kind, is provided with a free-wheel or clutch-device interposed between the compressor-turbine and the power-turbine such free-wheel device serving in the overdrive, i. e., when the power-turbine is driven by the driving wheels or equivalent propelling means, to connect the power-turbine drivingly with the compressor-turbine, thereby imposing a braking torque upon the power-turbine, due to driving the compressor-system from the road wheels or the equivalent.

According to this invention in another aspect, a gas-turbine power-plant comprises a compressor set having a compressor and a compressor-turbine, a vehicle driving set having a power-turbine for driving the vehicle propelling means, and an over-running driving connection between the compressor set and the driving set operative to drive the compressor set from the driving set when the latter over-runs the compressor set.

According to this invention in yet another aspect, a gas-turbine power plant comprises a compressor set having a compressor and a compressor-turbine, a vehicle-driving set having a power-turbine for driving the vehicle propelling means, and an over-running driving connection between the compressor-turbine and power-turbine operative to transmit a drive from the power-turbine to the compressor-turbine when the driving set tends to over-run the compressor.

According to a feature of the invention a gas-turbine vehicle power-plant installation comprises independent compressor and power-turbines and a free-wheel or clutch device adapted to connect the power-turbine with the compressor-turbine in the sense of over-drive of the power-turbine relative to the compressor-turbine, there being provided a reduction gear for driving the free-wheel or clutch-element associated with the power-turbine at a rotational speed which is less than the rotational speed of the power-turbine. Alternatively, the free-wheel or clutch element associated with the compressor turbine may be driven by the latter through a step-up gear. It is contemplated that such a reduction gear (or step-up gear) may be desirable to avoid excessive braking torque being applied by the compressor-turbine set in the over-drive.

According to a further feature, the invention provides for reducing the fuel-supply during deceleration of the vehicle to a value below that normally required for idling or slow running means being provided for increasing such fuel-supply to a value appropriate for idling, at a relatively low speed of the power-turbine, when the reverse or braking torque becomes ineffective. Adoption of this feature will enable the braking torque to be imposed by the compressor-set in a range of speed, within which the compressor-set would not normally run when self-driven, i. e. at low speeds, in which the set though self-driving, is inefficient. On an increase of the fuel-supply to a value corresponding to idling or slow running, the compressor-set will accelerate to idling speed.

In certain cases the reduced fuel-supply may merely maintain a pilot-flame within the combustion-equipment of the compressor-set, effecting ignition of fuel supplied to accelerate the set to idling speed. Such fuel-control may conveniently be effected by means of a governor driven at a speed proportional to the vehicle-speed, so that on closing the vehicle-throttle, the fuel-supply is shut off entirely (apart from the pilot flame or equivalent reduced supply), the governor device maintaining the throttle closed until a predetermined vehicle low speed is reached in deceleration. Alternatively, the governor device may be driven at a speed proportional to the power-turbine rotational speed, such an arrangement being suitable where a change-speed gear box is introduced into the transmission between the power-turbine and the road or equivalent wheels.

A gas-turbine vehicle power-plant will now be described by way of example of this invention, reference being made to the accompanying diagrammatic drawing illustrating the plant.

The gas-turbine power-plant comprises a centrifugal air compressor 10 having entry ducts 11, centrifugal impeller 12, and air-delivery volute 13. The air compressor is driven by an axial-flow single-stage turbine 14, through a drive shaft 15.

A power-turbine 16, also of the axial-flow single-stage type, drives through shaft 17 a high-speed pinion 18 of a reduction gear 19, the output shaft 20 of which is connected to the vehicle propelling means, e. g. the driving wheels 20A.

Air delivered by the compressor 10 through volute 13 passes into the casing of a heat exchanger through air-inlet 21. The heat exchanger comprises a matrix of heat exchange pipes 22, through which the exhaust gas from the turbines 14 and 16 passes after entering the heat exchanger through gas-inlet 23. The exhaust gas outlet from the heat-exchanger casing is shown at 24, and within the cylinder of the tube matrix 22 there is located a combustion chamber 25, which is surrounded by a tube 26. The tube 26 terminates at 27, so that air entering the heat-exchange casing through inlet 21 traverses tube matrix 22 to enter the combustion chamber through swirl cap 28 and entry holes 29, whilst part of the air flows down the annular passage 30 between the combustion chamber and the tube 26, entering the combustion chamber through holes 31. A fuel injection nozzle 32 is arranged to deliver liquid fuel into the combustion chamber, the air entering through the swirl cap 28 and apertures 29 and 31, constituting primary, secondary and tertiary air supplies to the combustion chamber in known manner.

It will be appreciated that in traversing the heat-exchange matrix 22, air delivered by the compressor 10 is preheated prior to entering into the combustion chamber, the products of combustion from the chamber being delivered through duct 33 into a volute chamber 34, the outlet from which is provided by a fixed turbine nozzle annulus 35 located upstream of the compressor-turbine 15. The exhaust flow from the turbine 14 passes through the annular passage 36 to a second fixed nozzle turbine annulus 37 located upstream of the moving blading of the power-turbine 16. The exhaust from the power-turbine 16 passes through the annular exhaust duct 38, which is provided as a diffusing passage, to enter the heat exchanger casing through the inlet 23.

According to this embodiment of the invention, there is provided a free-wheel device which is arranged to connect the power-turbine 16 with the compressor-turbine 14 in the sense of overdrive. To this end the compressor-turbine 14 drives a shaft 40 which carries a free-wheel clutch driven member 41. The free-wheel clutch driving member 42 is carried by a shaft 43, and rollers 44 are interposed between the free-wheel clutch driving and driven members, which rollers engage inclined surfaces, so as to jam the two parts together when the shaft 43 tends to rotate at a speed in excess of the shaft 40. Shaft 43 is driven by the turbine 16 through drive-shaft 45 carrying pinion 46 engaging spur gear 47 supported on lay-shaft 48. The lay-shaft 48 also carries a pinion 49 engaging spur gear 50, which latter gear is supported by the shaft 43.

The gear train described provides for the driving of the shaft 43 and clutch driving member 42 at a reduced speed compared with that of the power-turbine 16. For example, the value of the reduction in speeds effected by the gear train may be in the range of 3:2 and 5:4. This value will be determined according to the particular characteristics of the maximum running speeds of the compressor and power-turbine systems.

The embodiment of the invetnion shown in the drawing also includes a fuel system control, which is arranged to reduce the fuel supply to the power-plant during deceleration of the vehicle to a value which is less than that normally required for slow running. The fuel system comprises a fuel tank indicated at 60 supplying fuel to an engine-driven fuel pump 61, driven through shaft 62 and a suitable reduction gear from the compressor system 10. Fuel is delivered by the pump 61 through pipe line 63 to a main throttle 64, and thence through pipe line 65 to the fuel injection nozzle 32. The throttle valve 64 is arranged when closed to reduce the fuel supply below that required for slow running, and the fuel supply for slow running normally flows through by-pass pipe-line 66. An additional auxiliary fuel nozzle 67 is arranged to inject fuel into the combustion chamber, being supplied from the pipe-line 63 through pipe-line 68. This auxiliary nozzle 67 may constitute the means for effecting the initial ignition in the combustion chamber in starting of the power-plant, there being provided a suitable electric spark igniter plug associated therewith. Further, the fuel supply to the burner 67 is maintained at all times when the plant is running.

The by-pass fuel pipe-line 66 includes a shut-off valve 69 which is operated by means of a centrifugal governor 70, which governor is driven through shaft 71, bevel gearing 72 and shaft 73, by the power-turbine shaft 17. The setting of the governor 70 is such that the valve 69 is closed when the speed of the power-turbine exceeds a pre-selected value and is opened when the speed of the power-turbine falls below that pre-selected speed. Thus, when this value is exceeded the value 64 is fully closed and fuel delivery to the fuel injection nozzle 32 through the by-pass will cease. The fuel delivery is, however, maintained to the auxiliary burner 67, so as to maintain a pilot flame, available to ignite the fuel delivered by the burner 32, when the speed of the power-turbine 16 reduces below the pre-selected value, or when the throttle valve 64 is opened to accelerate the vehicle.

The functioning of the power-plant described above is as follows:

It is assumed that the compressor-turbine operates at a maximum speed in excess of the maximum speed of the power-turbine, corresponding to the maximum vehicle speed. Thus, at all times when power is being delivered to the driving wheels the compressor-turbine 14 is running at a speed in excess of the speed of the power-turbine 16.

When it is desired to decelerate the vehicle, the throttle valve 64 is moved in the sense of closure to reduce the fuel supply to the fuel nozzle 32. This results in deceleration of the compressor-turbine system until the speed of the free-wheel clutch driven member 41 corresponds to the speed of the free-wheel clutch driving member, 42, when the free-wheel drive engages through the medium of the rollers 44 to apply a braking torque to the driving wheels 20, due to the wheels driving the compressor set. The provision of a reduction gear between the power-turbine 16 and the clutch driving member 43 ensures that the torque which is imposed upon the power-turbine 16, when the free-wheel clutch engages, is not excessive, as might be the case if a direct drive were provided between the turbine 16 and the clutch part 42.

The governor 70 is set so that the valve 69 is maintained closed above a pre-selected, relatively low power-turbine speed, corresponding to a relatively low vehicle speed. Thus, the closure of the throttle valve 64, when the vehicle is travelling at a speed in excess of this pre-determined value, will result in cessation of fuel flow to the injection nozzle 32, the nozzle 67 maintaining a pilot flame. The braking torque imposed by the compressor 10 on the driving wheels will therefore be maintained throughout deceleration of the vehicle down to this pre-selected speed, when the valve 69 will be opened by the governor 70 to provide a fuel flow through the pipe-line 65 to the nozzle 32, appropriate to maintain slow-running of the power-plant. Below the pre-selected power-turbine speed, the braking torque will thus become ineffective, the compressor-turbine system accelerating up to normal slow-running speed.

Adoption of this fuel control system permits the braking torque to be maintained down to a vehicle speed which is less than that which would be permissible if the minimum compressor-turbine system speed were that defined by the normal slow-running condition of the engine. The lower limit of the compressor-turbine system speed during deceleration should be chosen such that the fuel supply, reinstated by opening of the valve 69, can accelerate the engine without giving rise to excessive temperatures.

It will be appreciated that the invention is not limited to the particular embodiment described above. For example, the reduction gear employed in driving the free-wheel clutch driving member may be of the epicyclic kind and the clutch may be of a kind comprising frictionally engaging faces moved in and out of engagement by hydraulic or mechanical actuating mechanism operated in accordance with the sense of drive or may be a hydraulic free-wheel clutch. Further, if desired, a simple change speed gear mechanism may be introduced in the transmission between the reduction gear from the power-turbine to the road wheels or equivalent propelling means.

I claim:

1. A gas-turbine land vehicle power-plant comprising a compressor, a turbine driving said compressor, a power turbine, land-engaging vehicle-propelling means, transmission means between said power-turbine and said propelling means, and a coupling between the compressor-turbine and the power-turbine which coupling is operative to permit a drive to be transmitted through it only from the power-turbine to the compressor-turbine.

2. A gas-turbine land vehicle power-plant comprising a compressor system, a compressor-turbine system driving said compressor system, a power-turbine system, land-engaging vehicle-propelling means, transmission mechanism between said power-turbine system and said propelling means, and a coupling arranged between said propelling means and said compressor system, which coupling is capable of permitting a drive to be transmitted through it from the propelling means to said compressor system, and does not transmit a drive in the reverse direction.

3. A gas-turbine land vehicle power-plant comprising a compressor system, a turbine system driving said compressor system, a power-turbine system land-engaging vehicle propelling means, driving mechanism between said power-turbine system and said propelling means, and a free-wheel clutch adapted to connect said propelling means with said compressor system to transmit a drive to the compressor system from the propelling means and to be incapable of driving the propelling means from the compressor system.

4. A gas-turbine land vehicle power plant comprising a compressor system, a compressor turbine system driving said compressor system, a first rotor in said compressor-turbine system, a power-turbine system, a second rotor in said power-turbine system, land-engaging vehicle propelling means, a transmission mechanism between said power-turbine system and said propelling means, a free-wheel clutch driven member associated with said compressor-turbine system, a free-wheel clutch driving member associated with said power-turbine system, driving connections between each of said clutch members and its associated turbine systems, gear means in said driving connections, such that the clutch members engage and disengage at a predetermined ratio of speeds of said first and second rotors.

5. A gas-turbine land vehicle power-plant comprising a compressor system, a compressor-turbine system, connected to drive said compressor-system, a first rotor in said compressor-turbine system, a power-turbine system, a second rotor in said power-turbine system, land-engaging vehicle propelling means, transmission mechanism between said power-turbine system and said propelling means, a free-wheel clutch driven member associated with said compressor-turbine system, a free-wheel clutch driving member associated with said power-turbine system, driving connections between each of said clutch members and its associated turbine system, gear means in said driving connections, such that the clutch members engage and disengage at a ratio of the speed of said first rotor to the speed of said second rotor which is less than unity.

6. A gas-turbine land vehicle power-plant comprising a compressor system, a compressor-turbine system connected to drive said compressor system, a first rotor in said compressor-turbine system, a power-turbine system, a second rotor in said power-turbine system, land engaging vehicle propelling means, transmission mechanism between said power-turbine system and said propelling means, a free-wheel clutch driven member associated with said compressor-turbine system a second free-wheel clutch driving member associated with said power-turbine system, a direct drive connection between said clutch driven member and said compressor-turbine system, a reduction gear drivingly connecting the said free-wheel clutch driving member and said power-turbine system, so that the clutch parts engage and disengage at a ratio of the speed of said first rotor to the speed of said second rotor, which is less than unity.

7. A gas-turbine land vehicle power-plant comprising a compressor system, combustion equipment, fuel delivery means to said combustion equipment, a compressor turbine system driving said compressor system, a power-turbine system, land-engaging vehicle propelling means, a drive transmitting mechanism between said power-turbine system and said propelling means, clutch means between said compressor-turbine and power-turbine systems arranged to connect the power-turbine system drivingly with the compressor system in the sense of drive from the power-turbine system to the compressor turbine system and to be inoperative to drive in the reverse direction, means for reducing the fuel supply to said combustion equipment to a value less than that normally required for slow-running of the power-plant when driving connection is effected through said clutch means between the power-turbine and compressor-turbine systems, and means for increasing said fuel supply to a value appropriate for slow-running of the power-plant at a predetermined rotational speed of the power-turbine system which, when the power-turbine system is driving the compressor-turbine system corresponds to a compressor-turbine system speed which is greater than the minimum self-driving speed of the plant and lower than said slow running speed.

8. A gas-turbine land vehicle power-plant comprising a compressor system, combustion equipment, fuel delivery means to said combustion equipment, a compressor turbine system driving said compressor system, a first rotor in said compressor-turbine system, a power-turbine system, a second rotor in said power-turbine system land-engaging vehicle propelling means, a drive transmitting mechanism between said power-turbine system and said propelling means, clutch mechanism arranged to connect the power-turbine system drivingly with the compressor-turbine system and to disconnect the power-turbine system from the compressor turbine system respectively above and below a ratio of the speed of said first rotor to the speed of said second rotor which is less than unity, fuel control means in said fuel delivery means arranged to reduce the fuel supply to a value less than that normally required for slow-running of the plant when said clutch mechanism connects said turbine systems and means for increasing said fuel supply to a value appropriate for slow-running of the plant at a predetermined rotational speed of the power-turbine system which, when the power-turbine system is driving the compressor-turbine system corresponds to a compressor-turbine system speed which is greater than the minimum self-driving speed of the plant and lower than said slow running speed.

9. A gas-turbine land vehicle power-plant as claimed in claim 7 including main fuel delivery means to said combustion equipment, auxiliary fuel delivery means to said combustion equipment, control means for cutting off the supply of fuel to said main fuel delivery means and for maintaining the supply of fuel to said auxiliary means, when the fuel supply is reduced below that required for slow-running of the power-plant.

10. A gas-turbine land vehicle power-plant comprising a compressor system, combustion equipment, fuel delivery means to said combustion equipment, a compressor-turbine system, driving said compressor system, a power-turbine system, land-engaging vehicle propelling means, transmission mechanism between said power-turbine system and said propelling means an over-running clutch means arranged to connect said power-turbine system drivingly to said compressor system in the sense of drive from the power-turbine system to the compressor system, centrifugal governor means driven at a speed proportional to the speed of the power-turbine system, fuel control means operated by said centrifugal governor means arranged to reduce the fuel delivered to said combustion equipment to a value less than that normally required for slow-running of the power-plant, said governor means being arranged to increase said fuel supply to a value appropriate for slow-running at a predetermined speed of the power-turbine system which, when the power-turbine system is driving the compressor-turbine system corresponds to a compressor-turbine system speed which is greater than the minimum self-driving speed of the plant and lower than said slow running speed.

11. A gas-turbine land vehicle power-plant as claimed in claim 10 comprising a first fuel delivery duct, fuel control valve means actuated by said centrifugal governor means in such first duct, a second fuel delivery duct in parallel with said first duct, and main power-control throttle means in said second duct.

12. A gas-turbine power-plant for land vehicle propulsion comprising a compressor set having a compressor and a compressor turbine drivingly connected together, land-engaging vehicle propelling means, a vehicle driving set having a power-turbine for driving said propelling means, and an over-running clutch having a clutch driving member connected to be driven by said driving set and a clutch driven member connected to drive said compressor set, and operative to drive the compressor set from the driving set when the clutch driving member tends to over-run the clutch driven member.

13. A gas-turbine power-plant for land vehicle propulsion comprising a compressor set having a compressor and a compressor-turbine drivingly connected together, land-engaging vehicle propelling means, a vehicle-driving set having a power-turbine for driving said propelling means, and an over-running driving connection having a cltuch driving member connected to be driven by said power turbine and a clutch driven member connected to drive said compressor turbine and operative to transmit a drive from the power-turbine to the compressor turbine when said clutch driving member tends to over-run said clutch driven member.

14. A gas-turbine power-plant as claimed in claim 13, wherein said compressor set includes a first rotor and said driving set includes a second rotor and wherein said over-running driving connection includes gearing such that the driving connection becomes effective only after the speed of said first rotor has fallen to a value having a preselected ratio to the speed of said second rotor.

15. A gas-turbine power-plant as claimed in claim 14 wherein the over-running driving connection includes a reduction gear between said clutch driving member and said power-turbine such that said clutch driving member rotates at a lower speed than the power-turbine.

16. A gas-turbine power-plant for land-vehicle propulsion comprising a compressor set having a compressor and a compressor-turbine drivingly connected together, land-engaging vehicle propulsion means, a vehicle-driving set having a power-turbine for driving said propelling means, a clutch driving member, a clutch driven member, a driving connection between the clutch driven member and the compressor-turbine, a second driving connection between the power-turbine and the clutch driving member, means operative to transmit a drive from the clutch driving member to the clutch driven member when the clutch driving member tends to over-run the clutch driven member, combustion equipment to which air is delivered from said compressor, fuel-supply means delivering fuel to the combustion equipment including a throttle valve to control the fuel supply for acceleration and deceleration, a slow-running fuel supply independent of said throttle valve to supply sufficient fuel for the plant to operate normally at slow running speed, a shut-off valve to close said slow-running fuel-supply, and governor means operated from the driving set to maintain the shut-off valve closed until the speed of the driving set has fallen below a preselected value which when the driving set and the compressor set are drivingly connected corresponds to a compressor set speed which is greater than the minimum self-driving speed of the plant and lower than said slow running speed and then to restore the slow-running fuel supply by opening the shut-off valve, and means to conduct combustion gases from the combustion equipment to the compressor turbine and power-turbine.

17. A gas-turbine power-plant as claimed in claim 16 wherein said fuel supply means includes a pilot fuel-supply independent of the throttle-controlled supply and the slow running fuel supply, which pilot-fuel supply delivers fuel to the combustion equipment throughout the operation of the plant.

18. A gas-turbine power-plant for a land vehicle propulsion comprising a compressor rotor; a first turbine rotor connected to drive said compressor rotor; land engaging vehicle propelling means; and overrunning clutch arranged between said propelling means and said compressor rotor whereby said compressor rotor provides braking torque to said propelling means during deceleration only of the vehicle, a second turbine connected to drive said propelling means; combustion equipment arranged to supply working fluid to both said turbines; a fuel supply system for said combustion equipment; means for reducing the fuel supply during deceleration of the vehicle to a value below that normally required for idling or slow running of the plant; and means for increasing the fuel supply to a value appropriate for idling or slow running of the plant when the speed of the second turbine has fallen to a pre-selected value which, when the propelling means is driving the compressor rotor, corresponds to a compressor speed which is greater than the minimum self-driving speed of the plant and lower than said idling speed.

19. A gas-turbine power-plant as claimed in claim 18 wherein the fuel supply means includes a main throttle which when closed reduces the fuel supply to a value below that required for slow running, an auxiliary fuel supply for supplying fuel during slow-running, a shut-off valve controlling said auxiliary fuel supply, speed responsive governor means to open said valve when the speed falls below a preselected speed and to hold it closed at speeds above said preselected speed.

20. A gas-turbine power-plant as claimed in claim 19, wherein said auxiliary fuel supply comprises a by-pass for the main throttle and said shut-off valve is located in the by-pass.

21. A gas-turbine power-plant as claimed in claim 20, wherein the fuel supply means also includes a pilot fuel supply which is arranged to be operative throughout running of the plant.

22. In a land vehicle, of the class comprising land-engaging propelling means, a compressor, a gas-turbine to drive said compressor, fuel supply means for said turbine, and control means for said fuel supply means including a speed-sensitive device arranged to control said fuel supply means to supply fuel appropriate for idling of said turbine and compressor when the speed sensed by said speed-sensitive device passes through a selected value during deceleration; the combination with said elements of a clutch between said compressor and said land-engaging propelling means and a drive connection between said speed-sensitive device and said propelling means.

SHADWELL HARRY GRYLLS.

REFERENCES CITED

The following references are of record in the file of this patent:

UNITED STATES PATENTS

| Number | Name | Date |
| --- | --- | --- |
| 1,839,880 | Hyatt | Jan. 5, 1932 |
| 2,078,957 | Lysholm | May 4, 1937 |
| 2,095,991 | Lysholm | Oct. 19, 1937 |
| 2,213,824 | Seeley | Sept. 3, 1940 |
| 2,374,510 | Traupel | Apr. 24, 1945 |
| 2,402,725 | Birkigt | June 25, 1946 |
| 2,464,724 | Sèdille | Mar. 15, 1949 |

FOREIGN PATENTS

| Number | Country | Date |
| --- | --- | --- |
| 350,661 | Great Britain | June 18, 1931 |